C. D. HELLYER.
ADJUSTABLE SPRING CAMPING BED.
APPLICATION FILED JULY 25, 1919.
1,330,533.
Patented Feb. 10, 1920.
2 SHEETS—SHEET 1.
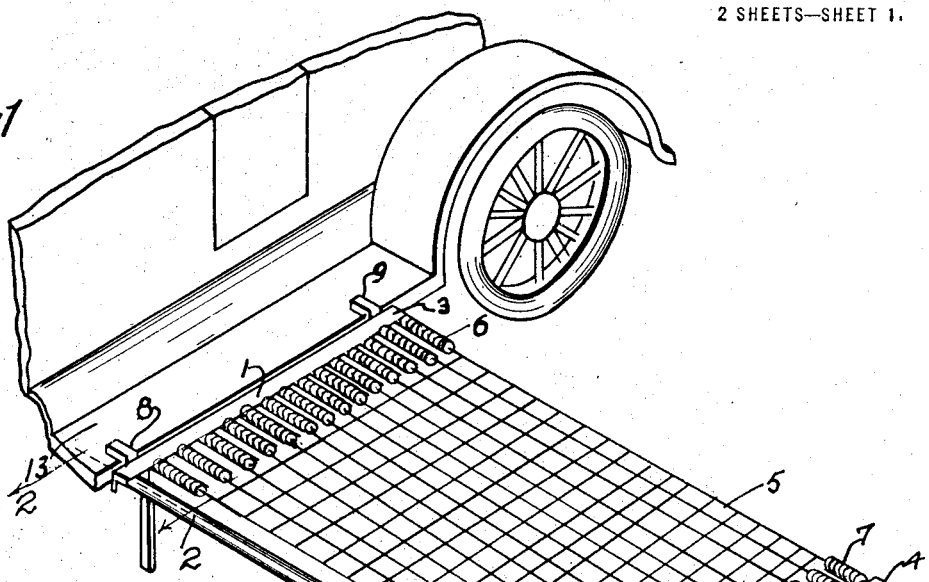
WITNESS:
INVENTOR.
C. D. Hellyer
BY Hazard & Miller
ATTORNEYS

C. D. HELLYER.
ADJUSTABLE SPRING CAMPING BED.
APPLICATION FILED JULY 25, 1919.

1,330,533.

Patented Feb. 10, 1920.
2 SHEETS—SHEET 2.

WITNESS:

INVENTOR.
C. D. Hellyer
BY Hazard & Miller
ATTORNEYS

UNITED STATES PATENT OFFICE.

CLEMENT D. HELLYER, OF LOS ANGELES, CALIFORNIA.

ADJUSTABLE SPRING CAMPING-BED.

1,330,533.  Specification of Letters Patent.  Patented Feb. 10, 1920.

Application filed July 25, 1919. Serial No. 313,315.

*To all whom it may concern:*

Be it known that I, CLEMENT D. HELLYER, a citizen of the United States, residing at Los Angeles, in the county of Los Angeles and State of California, have invented new and useful Improvements in Adjustable Spring Camping-Beds, of which the following is a specification.

My invention relates to adjustable spring camping beds and consists of the novel features herein shown, described and claimed.

My object is to make a spring bed which may readily be knocked down and rolled into a bundle for transportation and which may be readily set up and attached to the running board of an automobile or set up alone, the bed being especially adapted for camping purposes.

Figure 1 is a perspective of an adjustable spring camping bed embodying the principles of my invention and attached to the running board of an automobile ready for use, parts of the automobile being broken away.

Fig. 2 is a fragmentary perspective sectional detail on the line 2—2 of Fig. 1.

Fig. 3 is an enlarged perspective detail of one of the folding leg constructions.

Fig. 4 is an enlarged perspective detail of one of the spring adjusting constructions.

Figure 5:
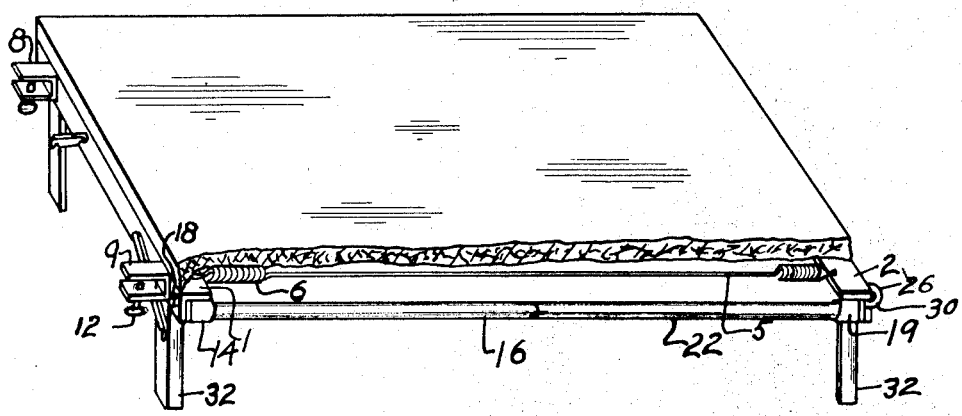
Fig. 5 is an isometric perspective of the bed set up alone.
Figure 6:
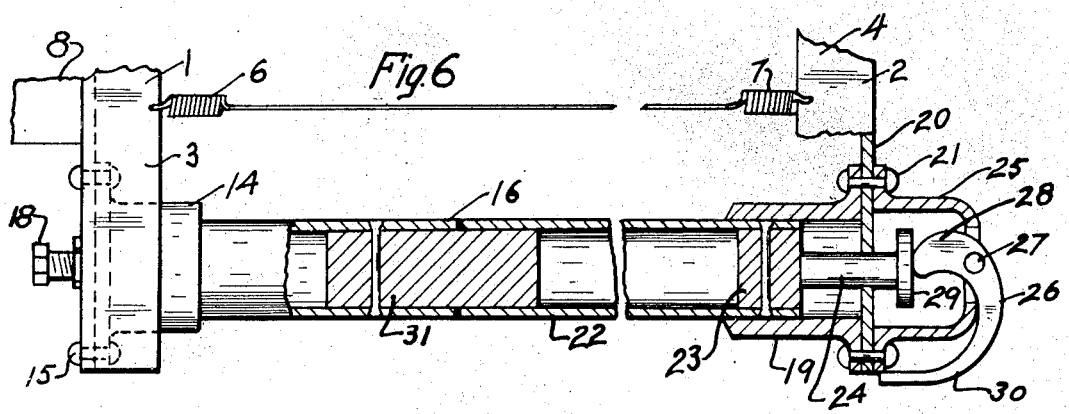
Fig. 6 is an enlarged sectional detail of one of the side bars showing the spring adjusting mechanism at both ends of the couplings and in the center.

The head rail 1 and the foot rail 2 are made of heavy angle iron set with the perforated flanges 3 and 4 horizontal and the other flanges extending downwardly. The fabric 5 has helicals 6 hooked into the flange 3, and helicals 7 hooked into the flange 4. U-clips 8 and 9 are connected to the vertical flange 10 of the angle iron 1 by rivets 11 and set screws 12 are tapped up through the lower arms of the clips to engage under the running board 13. Tubular sockets 14 are secured to the flange 10 near each end by rivets 15. The tubular side rails 16 have heads 17 fixed in their outer ends, and the outer ends slide in the sockets 14. Adjusting screws 18 are tapped through the flange 10 against the head 17 so that when the screws 18 are unscrewed the section 16 will go into the socket 14 and so that when the screws 18 are operated the other way the screws 18 engage the head 17 and push the section 16 out of the sockets 14 to the desired extent as required to assist in adjusting the tension of the fabric 5.

Sockets 19 are secured to a flange 20 of the angle iron 2 by rivets 21, and the side rail sections 22 slide into the sockets 19. Heads 23 are fixed in the ends of the sections 22, plungers 24 are slidingly mounted through the flange 20 against the heads 23, bearing frames 25 are secured against the outer face of the flange 20 by the rivets 21. Eccentric levers 26 are connected to the frames 25 by pivot pins 27 and have eccentric heads 28 engaging the heads 29 upon the plungers 24 and have operating handles 30 extending outwardly.

Internal couplings 31 are fixed in the ends of the sections 16 and slide into the ends of the sections 22 so that the ends of the sections 16 and 22 butt together and are held in a straight line. Angle iron legs 32 are pivotally connected to the ends of the head rail 1 and foot rail 2 by rivets 33, braces 34 are pivotally connected to the rails 1 and 2 by rivets 35 and rivets 36 are fixed in the legs 32 with their heads spaced away from the face of the legs. Notches 37 are formed in the free ends of the braces 34 so that when the legs 32 are straightened to their standing positions the braces 34 are swung downwardly to bring the rivets 36 into the notches 37.

The bed frame thus constructed is provided with four legs so that the bed will stand alone as in Fig. 5, when desired, and is provided with the U-clips 8 and 9 so that the bed may be attached to the running board 13 when desired.

Figure 7:
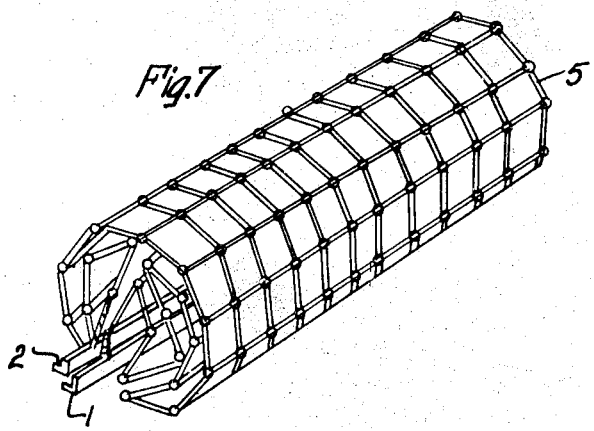
Fig. 7 is a perspective of the bed knocked down and rolled up for transportation.

When the bed has been set up as in Fig. 5 and it is desired to knock the bed down for transportation the handles 30 may be moved outwardly, thus operating the eccentrics 28 and allowing the plungers 24 to move outwardly and allowing the sockets 19 to move on to the side bars, thereby releasing the tension of the fabric, and if this does not release the tension of the fabric enough the screws 18 may be screwed outwardly until the side bars can be uncoupled, either at their centers or at either end, then the sections 16 and 22 may be separated, the legs folded, the end rails rolled upon the fabric, and a bundle produced as shown in Fig. 7.

Various changes may be made without departing from the spirit of my invention as claimed.

I claim:

1. A bed comprising end rails; elastic fabric secured to the end rails; sockets secured to the end rails; side bars having their ends inserted into the sockets; plungers slidingly mounted against the ends of the side bars; eccentrics pivotally mounted against the plungers; and handles upon the eccentrics, so that by manipulating the handles the fabric may be tightened or loosened.

2. A bed comprising end rails, elastic fabric secured to the end rails, sockets mounted upon the outer ends of the end rails, side bars having their ends inserted into the sockets, plungers slidably mounted in the sockets against the ends of the side bars, and means for forcing the plungers against the side bars to tighten the elastic fabric.

In testimony whereof I have signed my name to this specification.

CLEMENT D. HELLYER.